US012700671B2

(12) United States Patent
Yong

(10) Patent No.: US 12,700,671 B2
(45) Date of Patent: Aug. 4, 2026

(54) ANTENNA ASSEMBLY, DUAL-FREQUENCY WIDEBAND ANTENNA, AND ELECTRONIC DEVICE

(71) Applicant: GUANGDONG OPPO MOBILE TELECOMMUNICATIONS CORP., LTD., Dongguan (CN)

(72) Inventor: Zhengdong Yong, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 24 days.

(21) Appl. No.: 18/817,088

(22) Filed: Aug. 27, 2024

(65) Prior Publication Data

US 2024/0429603 A1 Dec. 26, 2024

Related U.S. Application Data

(63) Continuation of application No. PCT/CN2022/140156, filed on Dec. 19, 2022.

(30) Foreign Application Priority Data

Mar. 10, 2022 (CN) ......................... 202210234322.7

(51) Int. Cl.
*H01Q 5/25* (2015.01)
*H01Q 1/48* (2006.01)
(Continued)

(52) U.S. Cl.
CPC ................. *H01Q 5/25* (2015.01); *H01Q 1/48* (2013.01); *H01Q 5/50* (2015.01); *H01Q 9/0414* (2013.01); *H01Q 9/26* (2013.01); *H01Q 9/42* (2013.01)

(58) Field of Classification Search
CPC .. H01Q 5/25; H01Q 1/48; H01Q 5/50; H01Q 9/0414; H01Q 9/26; H01Q 9/42;
(Continued)

(56) References Cited

U.S. PATENT DOCUMENTS 10,084,241 B1 9/2018 Jenwatanavet et al.
11,626,662 B2 * 4/2023 Xue ....................... H01Q 5/335 343/702
(Continued)

FOREIGN PATENT DOCUMENTS

CN 101102008 A 1/2008
CN 101496222 A 7/2009
(Continued)

OTHER PUBLICATIONS

International Search Report of International Patent Application No. PCT/CN2022/140156, mailed Mar. 2, 2023, with English translation from WIPO.
(Continued)

*Primary Examiner* — Seung H Lee
(74) *Attorney, Agent, or Firm* — Ladas & Parry, LLP

(57) ABSTRACT

An antenna assembly, a dual-frequency wideband antenna, and an electronic device are provided. The antenna assembly includes an antenna radiator, a grounding point, and a feeding point. The grounding point is arranged on a middle portion of the antenna radiator. The feeding point is arranged on the antenna radiator and spaced from the grounding point. The feeding point is fed by a feeding source, such that the antenna radiator supports a first frequency band and a second frequency band. The first frequency band is different from the second frequency band.

16 Claims, 11 Drawing Sheets

(51) Int. Cl.

| | |
|---|---|
| ***H01Q 5/50*** | (2015.01) |
| ***H01Q 9/04*** | (2006.01) |
| ***H01Q 9/26*** | (2006.01) |
| ***H01Q 9/42*** | (2006.01) |

(58) Field of Classification Search
CPC ...... H01Q 5/364; H01Q 9/0421; H01Q 5/335; H01Q 1/38; H01Q 1/241; H01Q 1/50; H01Q 5/10; H01Q 5/20; H01Q 5/307
See application file for complete search history.

(56) References Cited

U.S. PATENT DOCUMENTS

| | | | | |
|---|---|---|---|---|
| 11,870,413 | B2 * | 1/2024 | Li | H01Q 5/378 |
| 2006/0281423 | A1 | 12/2006 | Caimi et al. | |
| 2011/0084883 | A1 | 4/2011 | Wong et al. | |
| 2020/0380327 | A1 | 12/2020 | Ueki | |
| 2020/0411986 | A1 | 12/2020 | Cooper et al. | |
| 2023/0335922 | A1 * | 10/2023 | Wang | H01Q 5/307 |

FOREIGN PATENT DOCUMENTS

| | | | |
|---|---|---|---|
| CN | 203367469 | U | 12/2013 |
| CN | 105337040 | A | 2/2016 |
| CN | 112151962 | A | 12/2020 |
| CN | 113948857 | A | 1/2022 |
| CN | 114122685 | A | 3/2022 |
| WO | 2023169040 | A1 | 9/2023 |

OTHER PUBLICATIONS

Written Opinion of the International Searching Authority in International Patent Application No. PCT/CN2022/140156, mailed Mar. 2, 2023, with partial English translation from applicant's foreign counsel and machine translation from WIPO.

Extended European Search Report from EP patent application No. 22930660.0, mailed May 9, 2025.

Chinese First Office Action, corresponding Chinese patent Application No. 202210234322.7, mailed Apr. 22, 2026, with search report (24 pages).

* cited by examiner

ANTENNA ASSEMBLY, DUAL-FREQUENCY WIDEBAND ANTENNA, AND ELECTRONIC DEVICE

CROSS REFERENCE TO RELATED APPLICATIONS

The present disclosure is a continuation of International Patent Application No. PCT/CN2022/140156, filed Dec. 19, 2022, which claims a priority to Chinese Patent Application No. 202210234322.7, filed Mar. 10, 2022, both of which are herein incorporated by reference in their entireties.

TECHNICAL FIELD

The present disclosure relates to the field of wireless communication technology, in particular to an antenna assembly, a dual-frequency wideband antenna, and an electronic device.

BACKGROUND

In recent years, mobile communication has become increasingly important in people's lives. In the era of the fifth generation (5G) mobile communication system, the requirements for antennas are increasingly raised.

Since an electronic device has a small space for antennas, how to ensure a small size and great radiation bandwidth of the antennas at the same time is an urgent problem.

SUMMARY

Some embodiments of the present disclosure provide an antenna assembly including an antenna radiator, a grounding point, and a feeding point. The grounding point is arranged on a middle portion of the antenna radiator. The feeding point is arranged on the antenna radiator and spaced from the grounding point. The feeding point is fed by a feeding source, such that the antenna radiator supports a first frequency band and a second frequency band. The first frequency band is different from the second frequency band.

Some embodiments of the present disclosure provide a dual-frequency wideband antenna including the antenna assembly mentioned above.

Some embodiments of the present disclosure provide an electronic device including the dual-frequency wideband antenna mentioned above.

BRIEF DESCRIPTION OF THE DRAWINGS

The drawings are used to further understand the technical solutions of the present disclosure, constitutes a part of the specification, are used together with embodiments of the present disclosure to explain the technical solutions of the present disclosure, and are not used to limit the technical solutions of the present disclosure.

FIG. 1(*b*) is a side view structural schematic view of the antenna assembly according to the first embodiment of the of the present disclosure.

FIG. 2(*b*) is a structural schematic view of an antenna assembly according to a third embodiment of the of the present disclosure.

FIG. 2(*c*) is a structural schematic view of an antenna assembly according to a fourth embodiment of the of the present disclosure.

FIG. 4(*b*) is a schematic diagram of a simulation current distribution of the antenna assembly served as the UWB antenna at the resonant frequency of 6.5 GHz according to the first embodiment of the present disclosure.

FIG. 5(*b*) is a schematic diagram of a simulation current distribution of the antenna assembly served as the UWB antenna at the resonant frequency of 8 GHz according to the first embodiment of the present disclosure.

DETAILED DESCRIPTIONS

Figure 1A:
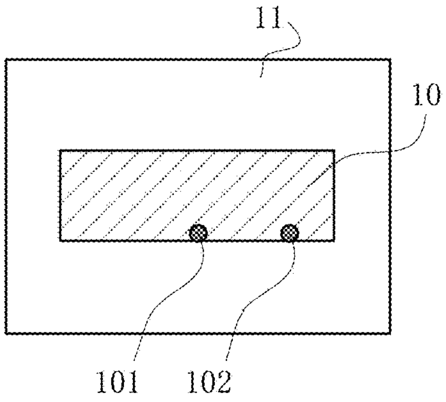
FIG. 1(*a*) is a top view structural schematic view of an antenna assembly according to a first embodiment of the of the present disclosure.

In order to clarify the purpose, technical solutions, and technical effects of the present disclosure, embodiments of the present disclosure are detailly described in conjunction with the drawings. It should be noted that, in the absence of conflicts, embodiments and features in the embodiments of the present disclosure may be combined arbitrarily with each other.

In order to facilitate understanding of the present disclosure, a comprehensive description of the present disclosure is provided in conjunction with relevant drawings. The embodiments of the present disclosure are shown in the accompanying drawings. However, the present disclosure may be implemented in many different forms and is not limited to the embodiments described herein. The purpose of the embodiments is to make the present disclosure clear and comprehensive.

Unless otherwise defined, all technical and scientific terms used in the embodiments of the present disclosure have the same meanings as understood by those skilled in the art. The terms used in the specification of the present disclosure are only for the purpose of describing embodiments and are not intended to limit the scope of the present disclosure.

It should be understood that terms "first" and "second" in embodiments of the present disclosure are only used for description purposes and cannot be understood as indicating or implying relative importance or implicitly indicating the number of technical features indicated. Thus, features defined as "first" and "second" may explicitly or implicitly include at least one of the features. In the embodiments of the present disclosure, "multiple" means at least two, such as two, or three, etc., unless otherwise specifically defined.

It should be understood that, in the following embodiments, the term "connection" should be understood as "electrical connection" or "communication connection", etc. if there are transmission of electrical signals or data between the connected circuits, modules, or units, etc.

When used, singular forms of "a" and "the" may include plural forms, unless the context clearly indicates otherwise. It should be understood that the terms "include/contain" or "have" represent the existence of the stated features, whole, step, operation, assembly, part, or combinations thereof, but do not exclude the possibility of the existence or addition of one or more other features, whole, step, operation, assembly, part, or combinations thereof. In addition, the term "and/or" used in the specification includes any and all combinations of the listed items.

An antenna assembly is provided, including: an antenna radiator; a grounding point, arranged on a middle portion of the antenna radiator; and a feeding point, arranged on the antenna radiator and spaced from the grounding point; wherein the feeding point is fed by a feeding source, such that the antenna radiator supports a first frequency band and a second frequency band, wherein the first frequency band is different from the second frequency band.

In some embodiments, a monopole antenna mode and a dipole antenna mode are excited on the antenna radiator under excitation of the feeding source; the monopole antenna mode is configured to support the first frequency band, and the dipole antenna mode is configured to support the second frequency band.

In some embodiments, the antenna assembly further includes: an impedance matching circuit, electrically connected between the feeding point and the feeding source.

In some embodiments, the impedance matching circuit includes an inductor L1, a capacitor C1, an inductor L2, and an inductor L3; the inductor L1 and the capacitor C1 are connected in series between the feeding point and the feeding source; one end of the inductor L2 is electrically connected to a connection point between the inductor L1 and the capacitor C1, and the other end of the inductor L2 is grounded; one end of the inductor L3 is electrically connected to the feeding source, and the other end of the inductor L3 is grounded.

In some embodiments, the antenna assembly further includes: an antenna bracket; wherein the antenna radiator is arranged on the antenna bracket.

In some embodiments, the antenna radiator is arranged on the antenna bracket through laser-direct-structuring (LDS) or laser reconstructed print (LRP) technology.

In some embodiments, the antenna radiator is arranged on a printed circuit board (PCB) of an electronic device where the antenna assembly is located, and the antenna radiator is a metal radiation patch.

In some embodiments, the antenna radiator is a metal radiation patch and the metal radiation patch is in a shape of a line, a "U", a zigzag, or an arc.

In some embodiments, in response the metal radiation patch of the antenna radiator being in the shape of the line and the shape of the line being a rectangle, the middle portion is a center point of a long side of the rectangle.

In some embodiments, in response the metal radiation patch of the antenna radiator being in the shape of the "U", the shape of the "U" includes a first portion, a second portion, and a third portion, the first portion and the third portion are connected to the second portion, the middle portion is a center point of a long side of the second portion, and the feeding point is located at the long side of the second portion and spaced from the grounding point.

In some embodiments, the third portion has a length greater than or equal to that of the first portion.

In some embodiments, in response to the third portion having a length greater than that of the first portion, the third portion defines the slot.

In some embodiments, the feeding point is electrically connected to the feeding source through an elastic sheet, and the grounding point is grounded through another elastic sheet.

A dual-frequency wideband antenna is provided, including: an antenna assembly, including: an antenna radiator; a grounding point, arranged on a middle portion of the antenna radiator; and a feeding point, arranged on the antenna radiator and spaced from the grounding point; wherein the feeding point is fed by a feeding source, such that the antenna radiator supports a first frequency band and a second frequency band, wherein the first frequency band is different from the second frequency band.

In some embodiments, a monopole antenna mode and a dipole antenna mode are excited on the antenna radiator under excitation of the feeding source; the monopole antenna mode is configured to support the first frequency band, and the dipole antenna mode is configured to support the second frequency band.

In some embodiments, the antenna assembly further includes: an impedance matching circuit, electrically connected between the feeding point and the feeding source.

In some embodiments, a length of the antenna radiator is 8 mm, a width of the antenna radiator is 2 mm, a distance between the feeding point and the grounding point is 2 mm.

An electronic device is provided, including a dual-frequency wideband antenna; wherein the dual-frequency wideband antenna, including: an antenna assembly, including: an antenna radiator; a grounding point, arranged on a middle portion of the antenna radiator; and a feeding point, arranged on the antenna radiator and spaced from the grounding point; wherein the feeding point is fed by a feeding source, such that the antenna radiator supports a first frequency band and a second frequency band, wherein the first frequency band is different from the second frequency band.

In some embodiments, a monopole antenna mode and a dipole antenna mode are excited on the antenna radiator under excitation of the feeding source; the monopole antenna mode is configured to support the first frequency band, and the dipole antenna mode is configured to support the second frequency band.

In some embodiments, the antenna assembly further includes: an impedance matching circuit, electrically connected between the feeding point and the feeding source.

Figure 1B:
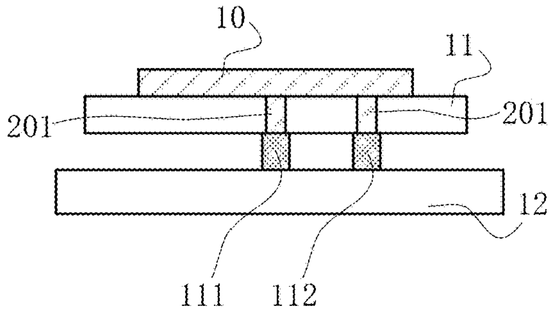

In order to increase a radiation bandwidth of an antenna and improve antenna efficiency, some embodiments of the present embodiment provide an antenna assembly, as shown in FIGS. 1(*a*) and 1(*b*). The antenna assembly at least includes an antenna radiator 10, and a grounding point 101 and a feeding point 102 are arranged on the antenna radiator 10.

The grounding point 101 is arranged on a middle portion of the antenna radiator 10 and spaced from the feeding point.

A same feeding source feeds an excitation signal into the antenna radiator 10 through the feeding point 102, so that the antenna radiator 10 supports a first frequency band and a second frequency band, and the first frequency band and the second frequency band are different from each other.

In the antenna assembly in some embodiments of the present disclosure, the grounding point is arranged on the middle portion of the antenna radiator, and the use of a single-feed allows the antenna radiator to support different first and second frequency bands, achieving dual frequency radiation, and effectively expanding the working bandwidth of the antenna, i.e., increasing radiation bandwidth of the antenna, thereby improving antenna efficiency.

In some embodiments, the antenna radiator 10 is fed through the feeding point 102, and under the excitation of the feeding source, the antenna radiator 10 generates two different modes of resonances. That is, resonances of two different modes respectively corresponding to the first frequency band and the second frequency band are generated on the antenna radiator 10. The two different modes include a monopole antenna mode and a dipole antenna mode. The monopole antenna mode is configured to support the first frequency band, and the dipole antenna mode is configured to support the second frequency band. In some embodiments, the first frequency band is lower than the second frequency band.

In some embodiments, the feeding point 102 is configured to be electrically connected to the feeding source, so that a signal generated by the feeding source may be transmitted to the antenna radiator 10 through the feeding point 102 and transmitted to the outside through the antenna radiator 10, or an external signal received by the antenna radiator 10 may be transmitted to the feeding source through the feeding point 102. In some embodiments, the feeding source may include but is not limited to a signal in an Ultra Wide Band (UWB) frequency band.

In some embodiments, an excitation signal in the UWB frequency band is fed into the antenna radiator 10 through the feeding point 102, a resonance of the monopole antenna mode and a resonance of the dipole antenna mode in the UWB frequency band may be simultaneously generated on the antenna radiator 10. That is, both the monopole antenna mode and the dipole antenna mode in the UWB frequency band are simultaneously excited on the antenna radiator under excitation of the feeding source, thereby achieving dual-frequency radiation, increasing radiation bandwidth, and improving antenna efficiency.

In some embodiments, as shown in FIG. 1(*b*), the feeding point 102 may be electrically connected to the feeding source through an elastic sheet 112. In some embodiments, the feeding source may be arranged on a printed circuit board (PCB) 12 and electrically connected to the antenna radiator 10 at the feed point 102 through the elastic sheet 112. The elastic sheet 112 may be coupled to the antenna radiator 10 at the feeding point 102, or may be directly electrically connected to the antenna radiator 10 at the feeding point 102 through a metal through-hole 201. The grounding point 101 may be grounded through metal through-hole 201 and the elastic sheet 111. In some embodiments, the grounding point 101 on the antenna radiator 10 may be electrically connected to a ground system of an electronic device through an elastic sheet 111, and the structure of the grounding point 101 may refer to the implementation of the feeding point and the feeding source, which is not repeated here. It should be understood that, the ground system may be a metal frame or PCB ground board in the electronic device. In some embodiments, the form of the ground system includes but is not limited to a metal conductive plate, or a metal conductive layer formed inside a flexible circuit board or a hard circuit board, etc.

In some embodiments, as shown in FIGS. 1(*a*) and 1(*b*), the antenna assembly provided by some embodiments of the present disclosure may further include an antenna bracket 11, and the antenna radiator 10 may be arranged on the antenna bracket 11 to form a bracket antenna. In some embodiments, the antenna radiator 10 may be arranged on the antenna bracket 11 through laser-direct-structuring (LDS), or laser reconstructed print (LRP), etc.

In some embodiments, the antenna radiator 10 may be arranged on a PCB surface of the electronic device where the antenna assembly is located, and the antenna radiator 10 is a metal radiation patch to form a patch antenna.

In some embodiments, the antenna radiator 10 may be in a shape of a line and the shape of the line is a rectangle as shown in FIG. 1(*a*). In some embodiments, in order to generate resonances of two different modes better when the feeding source feeds and improve the radiation characteristics of the antenna structure, the middle portion of the antenna radiator 10 may be a center point at a long side of the rectangle. That is, the grounding point 101 on the antenna radiator 10 is located at the center point of the long side of the rectangle. The center point here is not an absolute position, in which an error is allowed. FIG. 1(*a*) just illustrates an example, and the grounding point 101 may be arranged adjacent to a center point at the other long side of the rectangle. The feeding point 101 and the grounding point 101 are arranged at the same side of the rectangle, positions of which are not limited, as long as resonances of two different modes in the same frequency band may be generated on the antenna radiator 10, that is, dual-frequency radiation may be achieved, when the feeding source feeds. In some embodiments, the antenna radiator 10 is a patch antenna configured to be fed directly. When the patch antenna to be fed directly is served as a radiator, a wide impedance bandwidth in the UWB frequency band may be achieved, an excellent radiation performance is achieved, the size of the antenna assembly in the thickness direction is reduced, and the thickness of the electronic device is reduced.

Figure 2A:
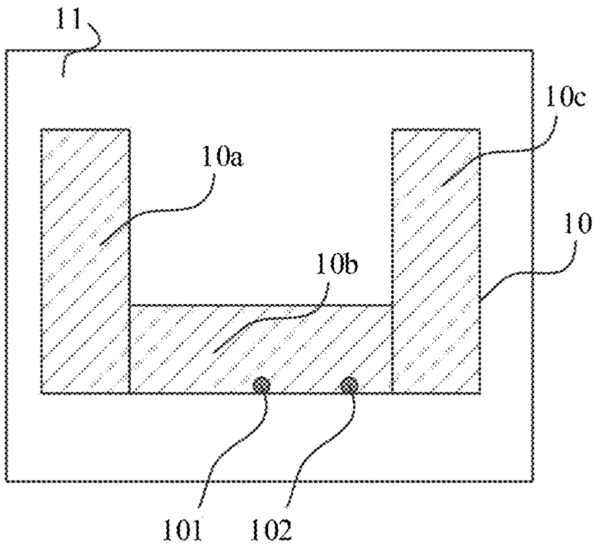
FIG. 2(*a*) is a structural schematic view of an antenna assembly according to a second embodiment of the of the present disclosure.
Figure 2B:
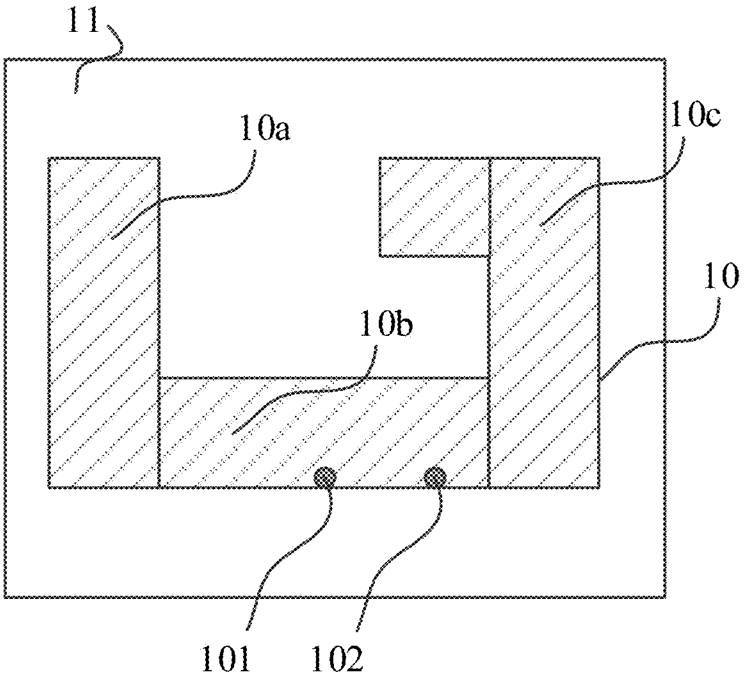
Figure 2C:
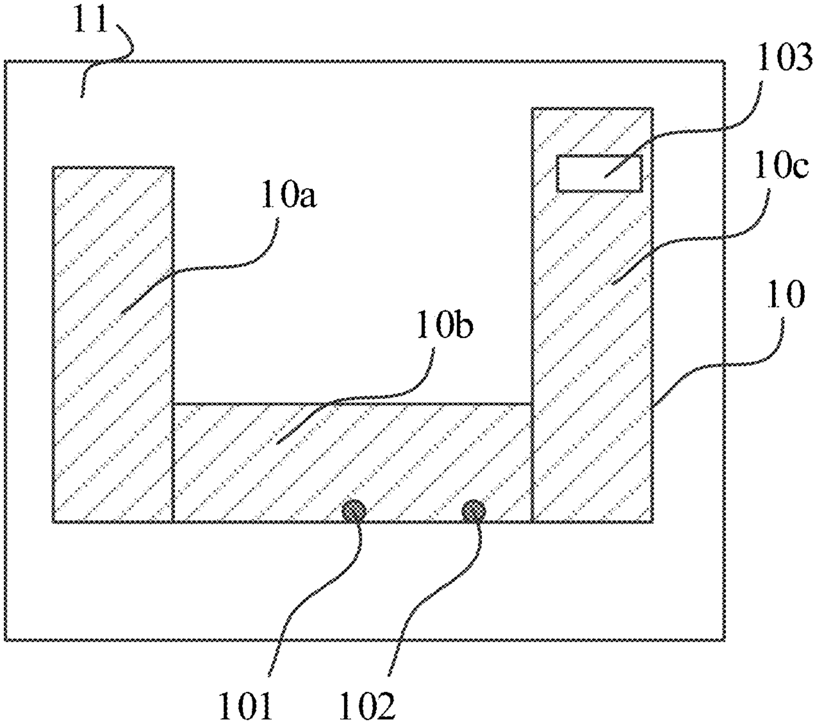

It should be noted that the antenna radiator 10 may be in a shape of a rectangle as shown in FIG. 1(*a*), a "U" shape as shown in FIGS. 2(*a*) and 2(*c*), a zigzag shape as shown in FIG. 2(*b*), or an arc shape, which is not limited and may be adjusted according to actual design or production need.

In some embodiments, the shape of the antenna radiator 10 shown in FIG. 1(*a*) is only an example and is not intended to limit the scope of protection of the present disclosure. In some embodiments, the antenna radiator 10 may be in a "U" shape as shown in FIG. 2(*a*), and the "U" shape has the same length at the two sides (as shown in FIG. 2(*a*)) or different lengths at the two sides (as shown in FIG. 2(*c*)). That is, in response the metal radiation patch of the antenna radiator 10 being in the shape of the "U", the shape of the "U" comprises a first portion 10*a*, a second portion 10*b*, and a third portion 10*c*, the first portion 10*a* and the third portion 10*c* are connected to the second portion 10*b*, the middle portion is a center point of a long side of the second portion 10*b*, and the feeding point 102 is located at the long side of the second portion 10*b* and spaced from the grounding point 101. The third portion 10*c* has a length greater than or equal to that of the first portion 10*a*. In another some embodiments, the shape of the antenna radiator 10 may be as shown in FIG. 2(*b*), in which a folding edge is folded from one side of the "U" shape to present a zigzag shape. That is, third portion 10*c* is folded. In another some embodiments, as shown in FIG. 2(*c*), a slot 103 or the like may be defined on the antenna radiator 10. That is, in response to the third portion 10*c* having a length greater than that of the first portion 10*a*, the third portion 10*c* defines the slot 103. An impedance is adjusted as the shape of the antenna radiator 10 is adjusted, i.e., branches included in the antenna radiator 10 are adjusted, and then the current distribution is adjusted. Thus, the antenna assembly of the present disclosure flexibly and simply achieves the dual frequency radiation, increases the radiation bandwidth, and thus improves the antenna efficiency.

In some embodiments, the antenna assembly provided by the embodiments of the present disclosure may further include an impedance matching circuit, and the feeding source is electrically connected to the feeding point 102 through the impedance matching circuit, so that an equivalent impedance of which the antenna radiator 10 as the antenna body is connected to the impedance matching circuit is matched with an input impedance of the feeding source, thereby improving the radiation efficiency of the antenna. In some embodiments, the feeding point 102 is electrically connected to the impedance matching circuit through the elastic sheet 112. That is, the feeding source may be electrically connected to the antenna radiator 10 at the feeding point 102 through the impedance matching circuit and the elastic sheet 112. In some embodiments, the antenna assembly may include an impedance matching control circuit configured to select from multiple impedance matching circuits. The impedance matching control circuit may include an impedance switching device and multiple different impedance matching circuits connected in parallel and connected to the impedance switching device. In this way, one of the multiple different impedance matching circuits may be switched through the impedance switching device to adjust the matching impedance of the antenna. That is to say, the impedance matching circuit of the antenna assembly in some embodiments of the present disclosure may have an adjustable impedance value. By adjusting the impedance value of the impedance matching circuit, a corresponding resonance point may be adjusted to change the resonance point of the antenna, so that the antenna may operate in multiple frequency bands with a wider range and switch among different frequency bands. It should be noted that, in order to save space, the simplest impedance matching circuit may be configured. There are many implementations for the impedance matching control circuit and the impedance matching circuits in the embodiments of the present disclosure, which are not intended to limit the scope of the present disclosure.

In some embodiments, in the case where the feeding source is electrically connected to the antenna radiator 10 at the feeding point 102 through the impedance matching circuit and the elastic sheet 112, the antenna radiator 10 may be made to have a smaller size. In other embodiments, when the size of the antenna radiator 10 is large enough, for example, the antenna radiator 10 is in a shape of a larger rectangle, a larger "U" shape, or a larger zigzag shape, etc., the impedance matching circuits may not be configured.

Figure 3:
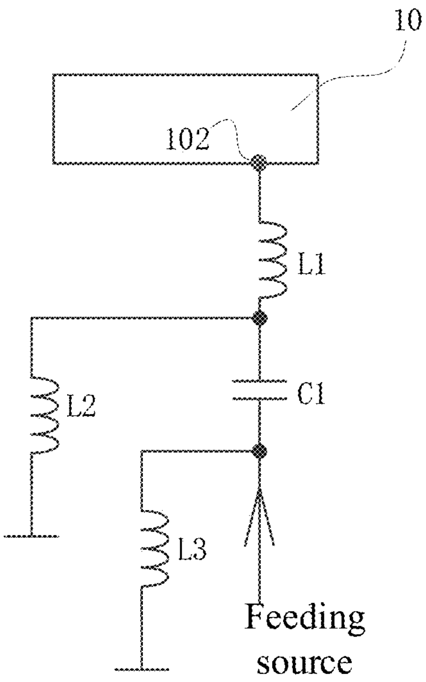
FIG. 3 is a diagram of an impedance matching circuit according to some embodiments of the of the present disclosure.

For example, in the antenna assembly shown in FIG. 1(*a*), the length of the antenna radiator 10 may be 8 mm, the width of the antenna radiator 10 may be 2 mm, the grounding point 101 may be located at the center of the long side of the antenna radiator 10, a distance between the feeding point 102 and the grounding point 101 may be 2 mm (as shown in FIG. 1(*a*), the feeding point 102 arranged at the right side of the grounding point 101 is taken as an example), the thickness of the antenna bracket 11 may be 1 mm, and the distance between the antenna bracket 11 and the PCB ground board 12 may be 1.5 mm. In some embodiments, the impedance matching circuit is shown in FIG. 3, in which an inductor L1 and a capacitor C1 are connected in series between the feed point 102 and the feeding source, one end of an inductor L2 is electrically connected to a connection point between the inductor L1 and the capacitor C1, the other end of inductor L2 is grounded, one end of an inductor L3 is electrically connected to the feeding source, and the other end of the inductor L3 is grounded. In some embodiments, inductances of the inductor L1 and the inductor L3 may be 2 nH, an inductance of the inductor L2 may be 2.5 nH, and a capacitance of the capacitor C1 may be 0.2 PF. It should be noted that there are many implementations for the impedance matching circuit in the embodiments of the present disclosure. The impedance matching circuit shown in FIG. 3 is only an example and is not intended to limit the scope of the present disclosure.

Figure 4A:
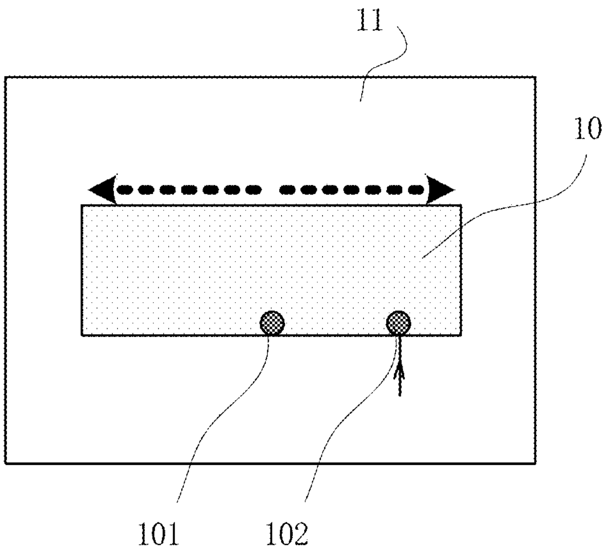
FIG. 4(*a*) is a schematic diagram of a current distribution of an antenna assembly served as an UWB antenna at a resonant frequency of 6.5 GHz according to a first embodiment of the of the present disclosure.
Figure 4B:
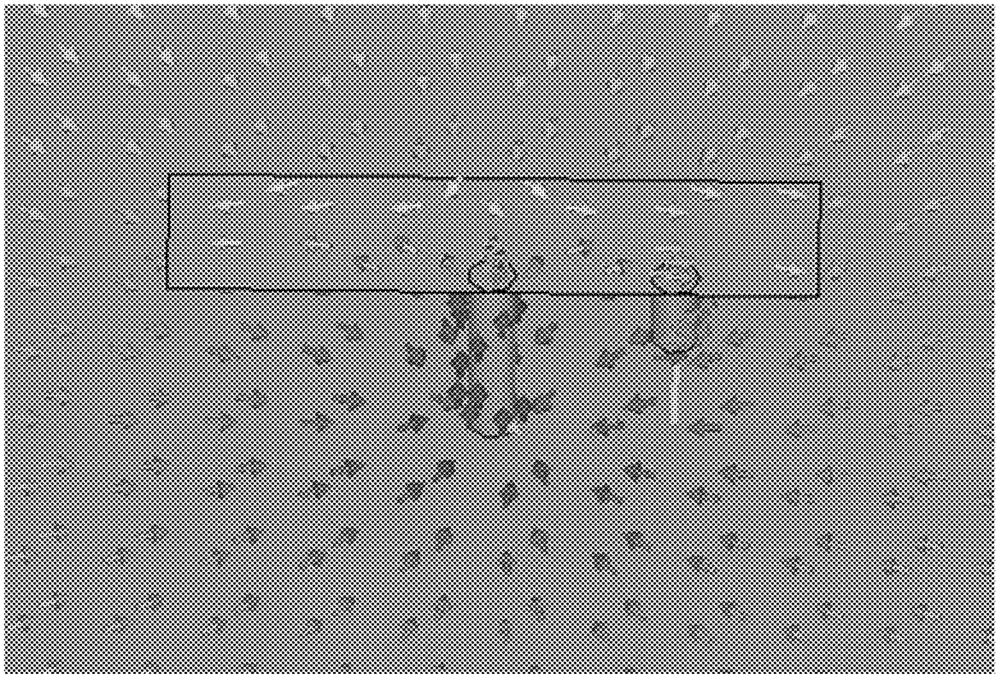
Figure 5A:
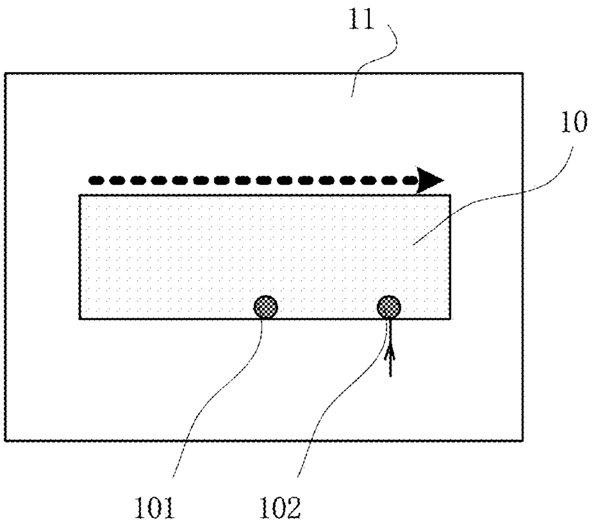
FIG. 5(*a*) is a schematic diagram of the current distribution of the antenna assembly served as the UWB antenna at a resonant frequency of 8 GHz according to the first embodiment of the present disclosure.
Figure 5B:
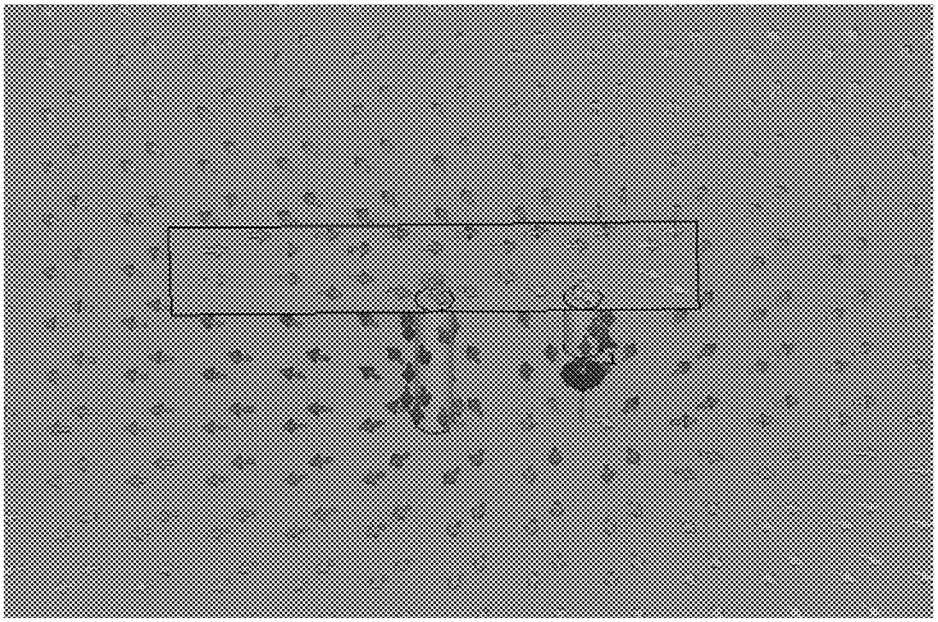
Figure 6:
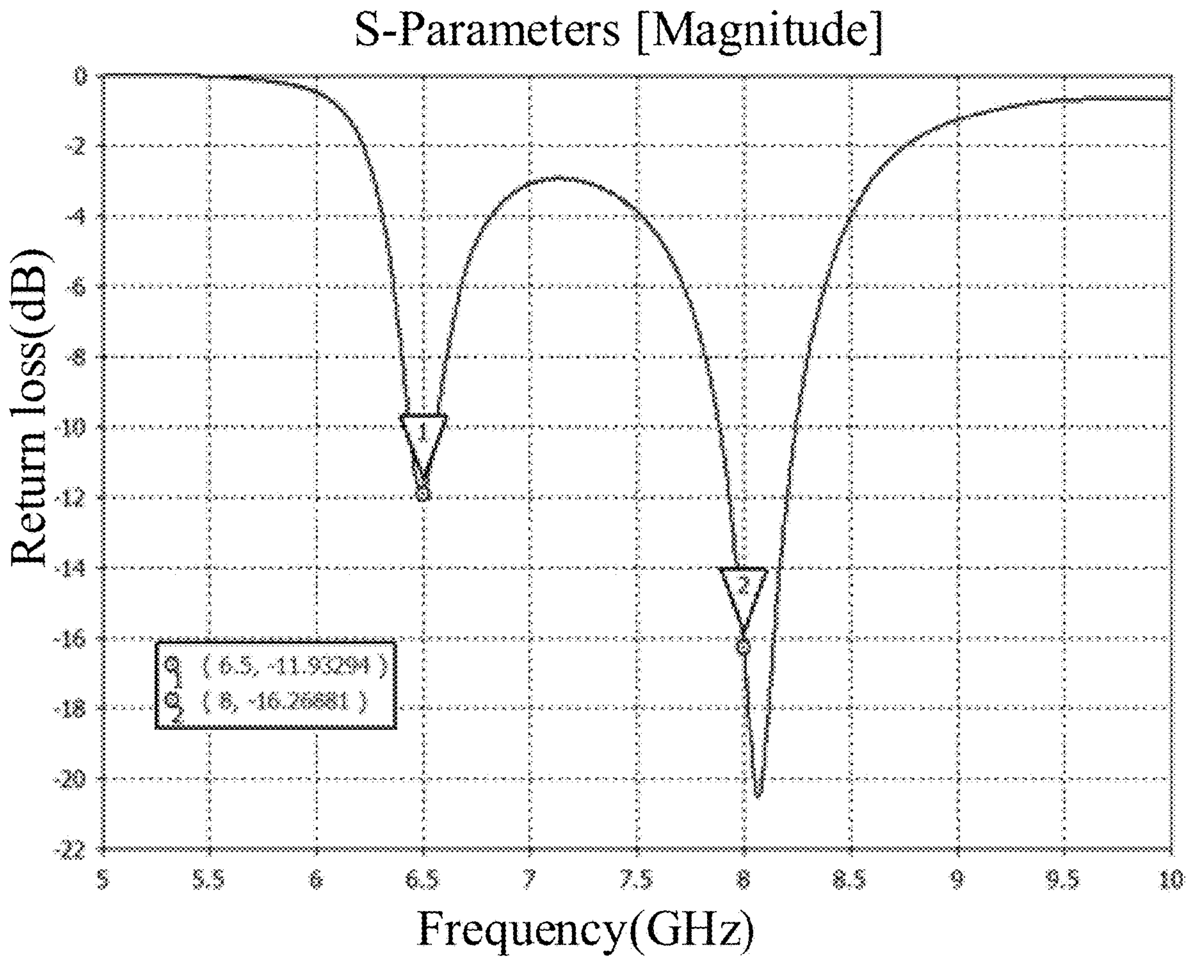
FIG. 6 is a schematic diagram of a S11 curve of the antenna assembly served as the UWB antenna according to the first embodiment of the present disclosure.
Figure 7:
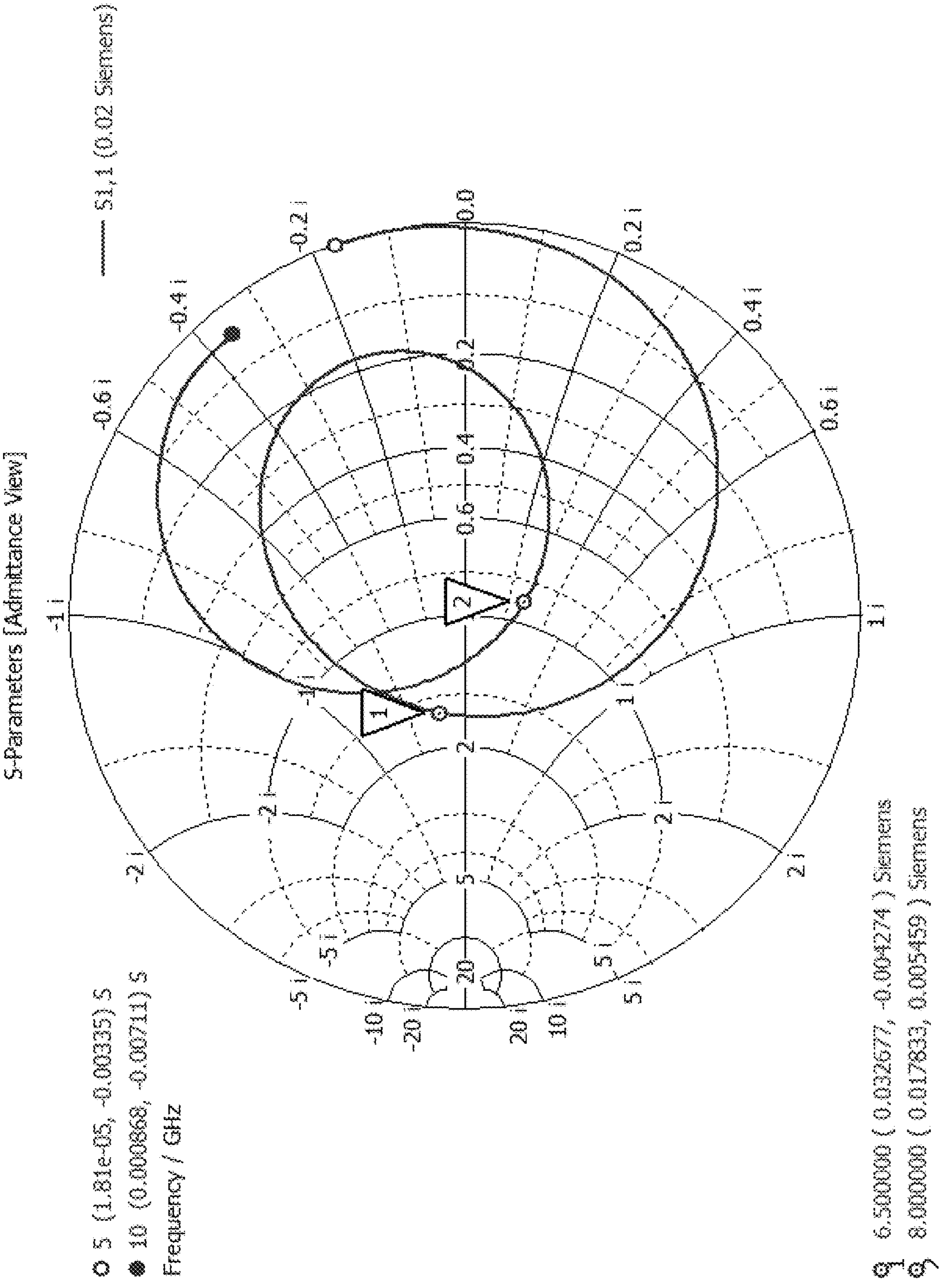
FIG. 7 is a Smith chart of the antenna assembly served as the UWB antenna according to the first embodiment of the present disclosure.

When the feeding source feeds a signal in the UWB frequency band, the antenna assembly provided in some embodiments of the present disclosure is a UWB antenna, and may excite two different modes. As shown in FIGS. 4(*a*) and 4(*b*), currents of 6.5 GHz on the antenna radiator 10 are in reversed directions, which corresponds to the monopole antenna mode. As shown in FIG. 5(*a*) and FIG. 5(*b*), currents of 8 GHz on antenna radiator 10 are in the same direction, which corresponds to the dipole antenna mode. FIG. 6 is a schematic diagram of a S11 curve of the antenna assembly served as the UWB antenna, it may be seen that, by referring to the S11 curve, when the feeding source feeds, the antenna assembly may generate two resonances. The resonance point of the first resonance may be located at 6.5 GHZ, and the resonance point of the second resonance may be located at 8 GHz. From the schematic diagram of the S11 curve shown in FIG. 6, it may be seen that return losses of the UWB antenna in some embodiments of the present embodiment may be less than −10 dB at both monopole antenna mode and dipole antenna mode, in which minimum −20 dB may reached. Moreover, both frequency bands at 6.5 GHz and 8 GHz meet the requirement of a bandwidth of 500 MHz and have wideband characteristics. A Smith chart of the antenna assembly served as the UWB antenna in some embodiments of the present embodiment is shown in FIG. 7. Therefore, the antenna assembly provided in some embodiments of the present disclosure achieves the dual frequency radiation, effectively expands the operating bandwidth of the antenna, that is, increases the radiation bandwidth, thereby improving the antenna efficiency.

The operating frequency band of the antenna assembly provided in the embodiments of the present disclosure meets the coverage of at least 500 MHz bandwidth in the range of 3.1 GHZ-10.6 GHz. According to the regulations of the Federal Communications Commission (FCC) in the United States, the operating frequency range of UWB antenna is from 3.1 GHz to 10.6 GHz, and the minimum operating bandwidth is 500 MHz, which means the bandwidth of more than 500 MHz is occupied in the 3.1 GHZ-10.6 GHz frequency band. Therefore, the antenna assembly provided in the embodiments of the present disclosure may serve as the UWB antenna. The UWB is a short distance wireless communication technology, of which a transmission distance is less than 10 m, and which adopts a bandwidth of more than 1 GHz. The UWB does not adopts a carrier wave, but adopts non-sinusoidal narrow pulses in nanoseconds to picoseconds level to transmit data. Therefore, the UWB occupies a wide spectrum range, and is suitable for wireless personal communication with high speed and short distance.

Figure 8:
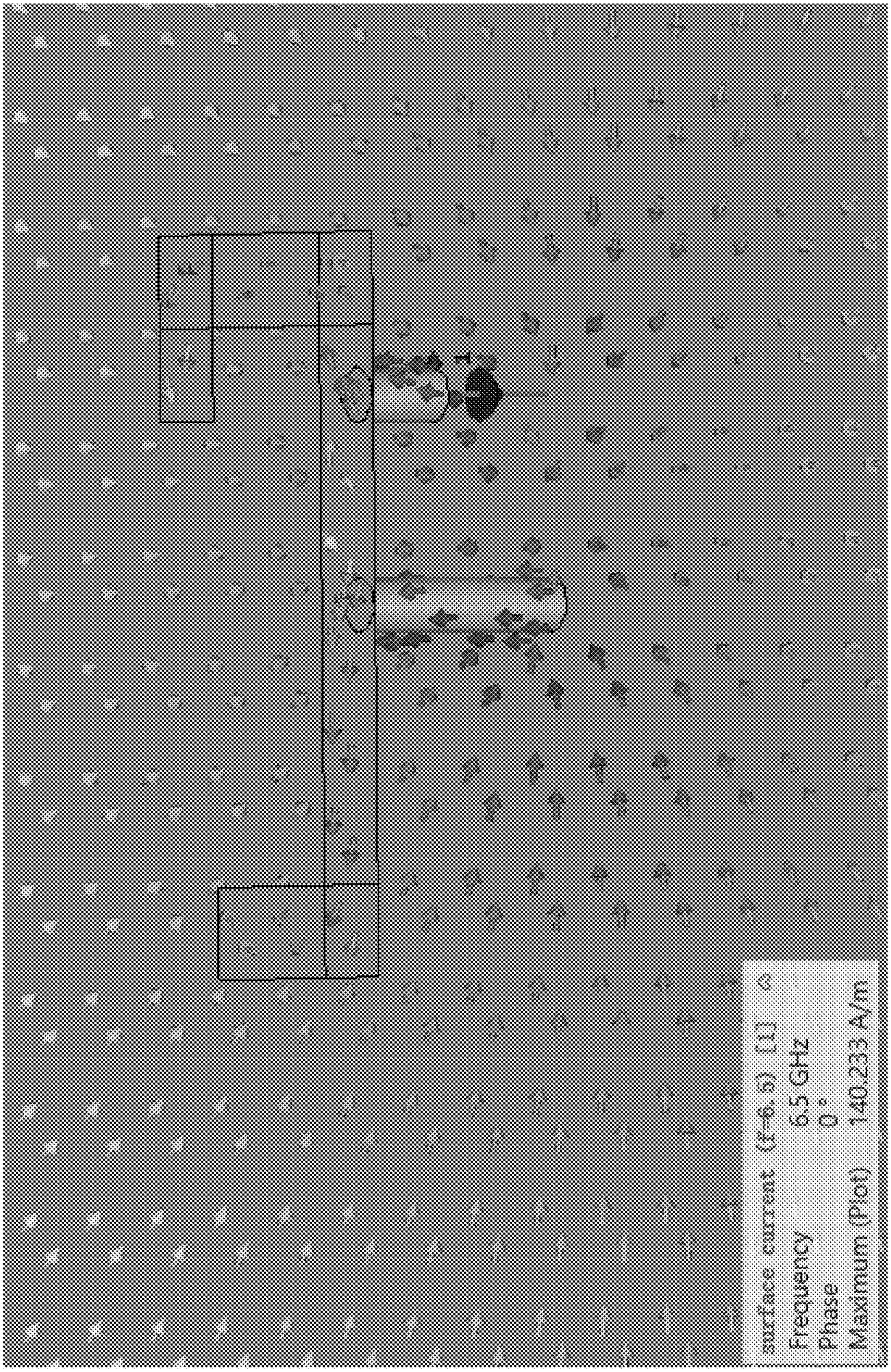
FIG. 8 is a schematic diagram of a simulation current distribution of an antenna assembly served as an UWB antenna at a resonant frequency of 6.5 GHz according to a second embodiment of the present disclosure.
Figure 9:
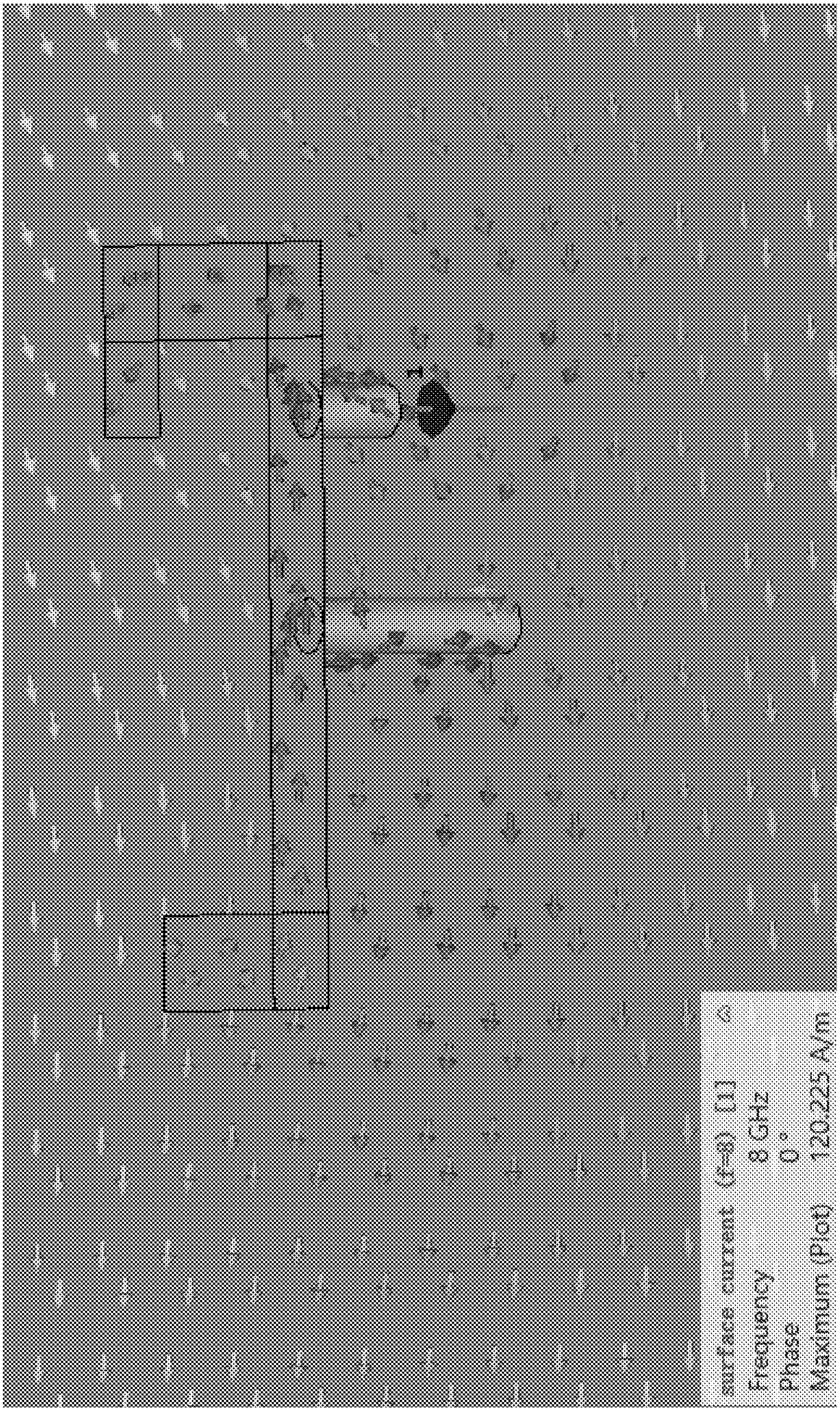
FIG. 9 is a schematic diagram of a simulation current distribution of the antenna assembly served as the UWB antenna at a resonant frequency of 8 GHz according to the second embodiment of the present disclosure.
Figure 10:
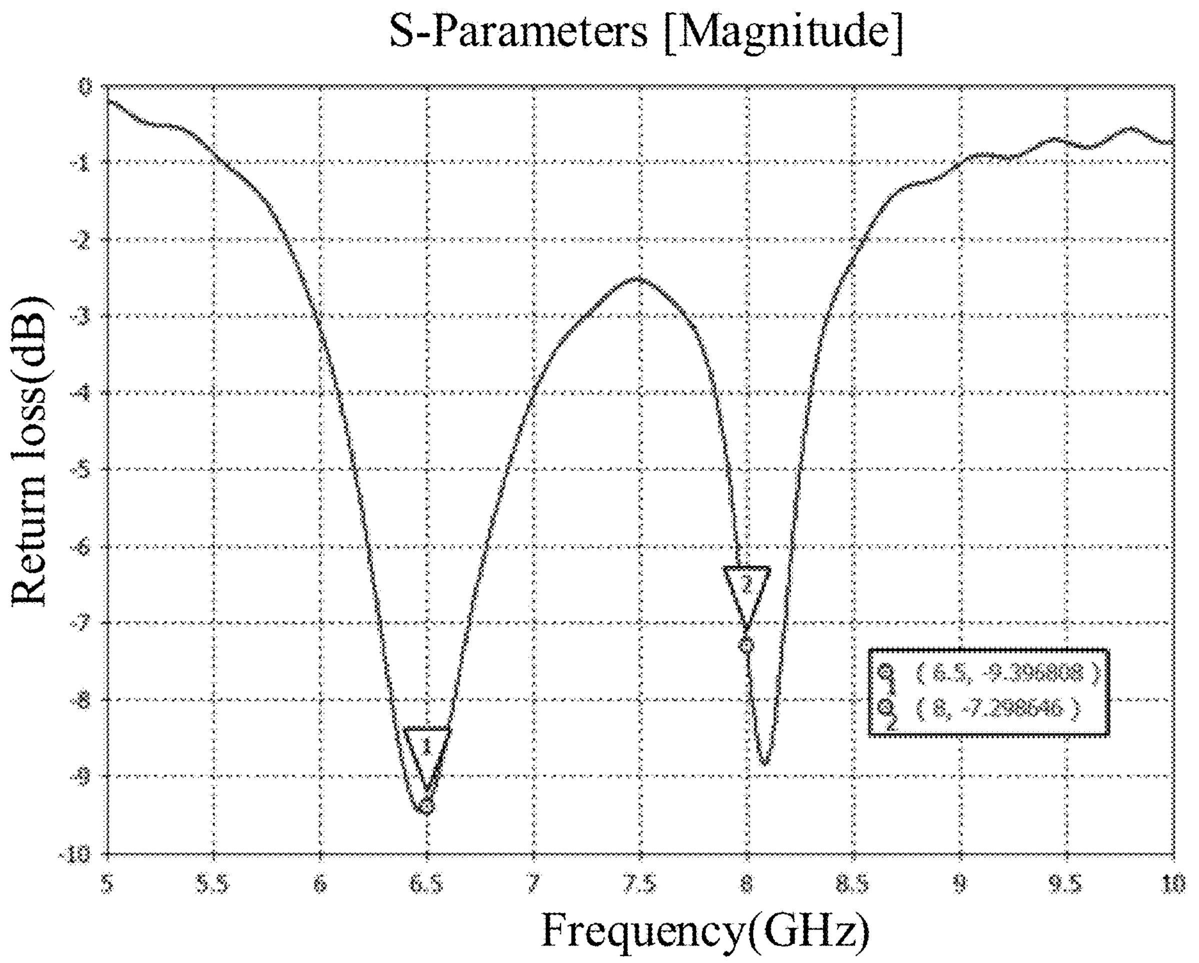
FIG. 10 is a schematic diagram of a S11 curve of the antenna assembly served as the UWB antenna according to the second embodiment of the present disclosure.
Figure 11:
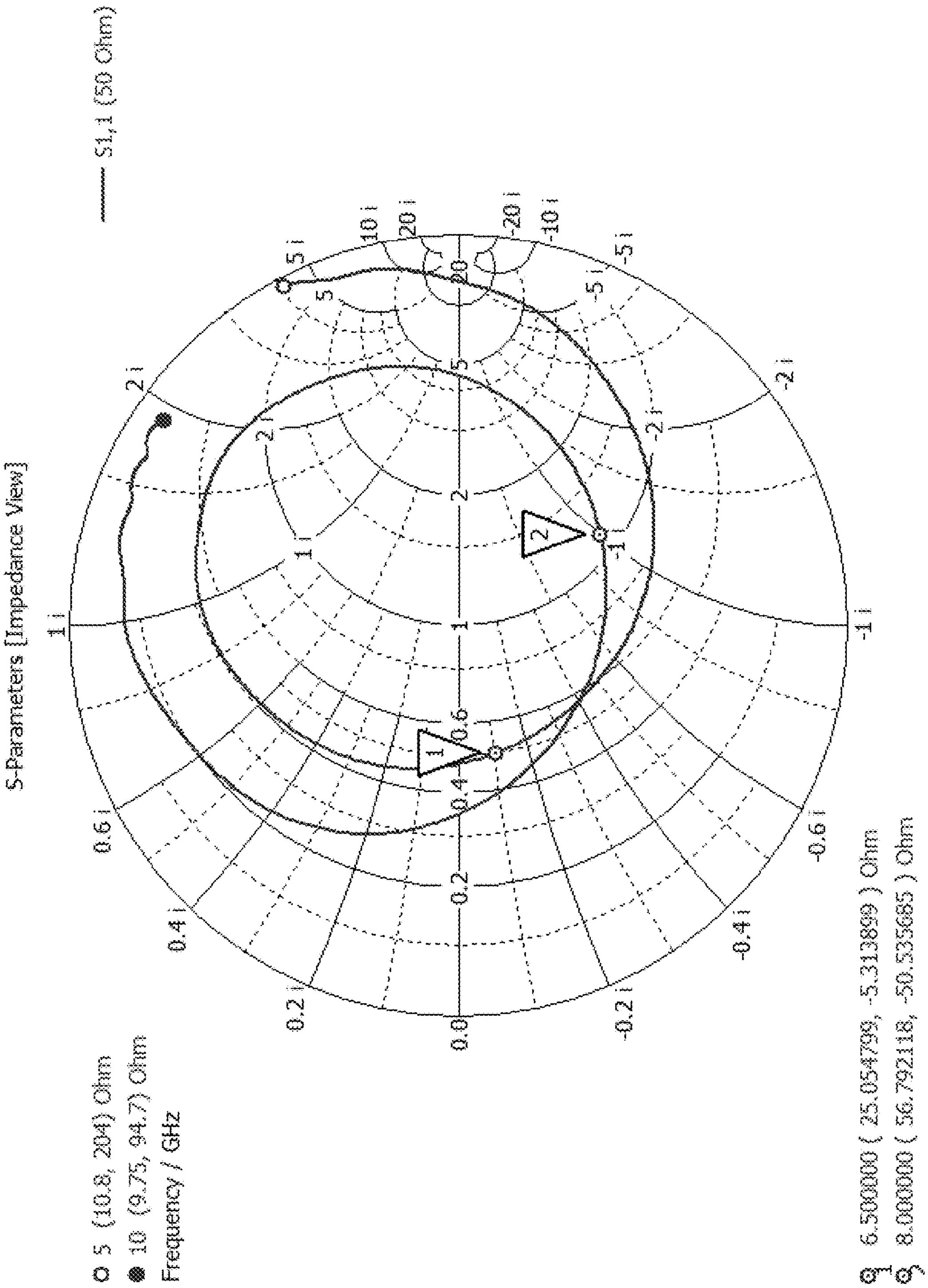
FIG. 11 is a Smith chart of the antenna assembly served as the UWB antenna according to the second embodiment of the present disclosure.

For another example, as shown in FIG. 2(*b*), in this embodiment, the antenna radiator 10 is larger than the antenna radiator 10 shown in FIG. 1(*a*). In the case where the antenna radiator 10 is increased, the antenna assembly provided in some embodiments of the present disclosure may effectively excite dual-frequency resonance even without the impedance matching circuit. When the feeding source feeds a signal in the UWB frequency band, two different modes are excited. As shown in FIG. 8, currents of 6.5 GHz on the antenna radiator 10 are in reversed directions, which corresponds to the monopole antenna mode. As shown in FIG. 9, currents of 8 GHz on antenna radiator 10 are in the same direction, which corresponds to the dipole antenna mode. FIG. 10 is a schematic diagram of a S11 curve of the antenna assembly served as the UWB antenna, it may be seen that, by referring to the S11 curve, when the feeding source feeds, the antenna assembly may generate two resonances. The resonance point of the first resonance may be located at 6.5 GHZ, and the resonance point of the second resonance may be located at 8 GHz. Both 6.5 GHz and 8 GHz frequency bands meet the requirement of a bandwidth of 500 MHz and have wideband characteristics. A Smith chart of the antenna assembly served as the UWB antenna in some embodiments of the present embodiment is shown in FIG. 11. Therefore, the antenna assembly provided in some embodiments of the present disclosure achieves the dual frequency radiation, effectively expands the working bandwidth of the antenna, that is, increase the radiation bandwidth, thereby improving the antenna efficiency.

Some embodiments of the present disclosure provide a dual-frequency wideband antenna including an antenna assembly, the antenna assembly includes the antenna radiator 10, and the grounding point 101 and the feeding point 102 are arranged on the antenna radiator 10.

The grounding point 101 is arranged on the middle portion of the antenna radiator 10.

The excitation signals are fed into the antenna radiator 10 through the feeding point 102, resonances of two different modes in the UWB frequency band are generated on the antenna radiator 10, and the resonances of two different modes of the dual-frequency wideband antenna may include the resonance in the monopole antenna mode and the resonance in the dipole antenna mode.

In some embodiments, the antenna assembly provided in some embodiments of the present disclosure may include the antenna bracket 11, and the antenna radiator 10 may be arranged on the antenna bracket 11 to form the bracket antenna.

In some embodiments, the antenna radiator 10 may be arranged on the PCB surface of the electronic device where the antenna assembly is located to form a patch antenna.

In some embodiment, the dual-frequency wideband antenna provided in some embodiments of the present disclosure may include the impedance matching circuit arranged between the feeding source and the feeding point 102. In some embodiments, the antenna radiator 10 may in a shape of a rectangle, and the grounding point 101 on the antenna radiator 10 is located at the center point of the long side of the rectangle. In some embodiments, the length of the antenna radiator 10 may be 8 mm, the width of the antenna radiator 10 may be 2 mm, the distance between the feeding point 102 and the grounding point 101 on antenna radiator 10 may be 2 mm, the thickness of antenna bracket 11 in the dual-frequency wideband antenna may be 1 mm, and the distance between the antenna bracket 11 and the ground board of the electronic device where the dual-frequency wideband antenna is located is 1.5 mm. In some embodiments, the ground board may include the middle frame or PCB ground board of the electronic device where the dual-frequency wideband antenna is located.

Generally speaking, for an antenna with an overall height less than 0.1 times the wavelength, the antenna may be called a low profile antenna (LPA). In the dual-frequency wideband antenna provided in some embodiments of the present disclosure, since the distance between the antenna bracket 11 carrying the antenna radiator 10 and the ground board of the electronic device where the dual-frequency wideband antenna is located is only 1.5 mm, which is far less than 0.1 times the wavelength of 37.5 mm corresponding to 8 GHz, the dual-frequency wideband antenna provided in some embodiments of the present disclosure is the low profile antenna, thereby effectively meeting the lightweight requirement for the electronic device where the dual-frequency wideband antenna is located. Moreover, the dual-frequency wideband antenna provided in some embodiments of the present disclosure may further has single-feed wideband dual-frequency characteristics. As shown in FIG. 6, UWB channels 5 and 9 are covered, whose center frequencies are 6.5 GHz and 8 GHz and bandwidth are 500 MHz. That is to say, the dual-frequency wideband antenna provided in some embodiments of the present disclosure is a low profile dual-frequency wideband antenna, which ensures the minimization of antenna size and maximizes the coverage of the frequency range of the antenna, thereby improving the antenna efficiency.

The dual-frequency wideband antenna provided in some embodiments of the present disclosure effectively meets UWB positioning requirement, covers resonant frequency bands of two different modes. In some embodiments, the frequency bands of 6.5 GHz and 8 GHz are covered, so that good resonance is achieved, bandwidth is expanded, and the dual-frequency wideband antenna has a small size. In some embodiments, the dual-frequency wideband antenna provided in the embodiments of the present disclosure is the low profile dual-frequency wideband antenna, which ensures the minimization of antenna size and achieves maximum frequency coverage, thereby improving the antenna efficiency.

Some embodiments of the present disclosure provide an electronic device including the dual-frequency wideband antenna as described in any one of the embodiments of the present disclosure. The electronic device provided in the embodiments of the present disclosure may be any device with communication functions, such as a tablet, a mobile phone, an e-reader, a remote control, a personal computer, a laptop, a car device, a network TV, a wearable device, or other devices. The electronic device may achieve an electromagnetic wave communication function, that is, the electronic device may receive and/or transmit electromagnetic wave signals.

Although the embodiments disclosed in the present disclosure are as described above, the content is only for the convenience of understanding the embodiments adopted in the present disclosure and is not intended to limit the present disclosure. Those skilled in the art may make any modifications and changes in the form and details of the implementation without departing from the spirit and scope disclosed in the present disclosure, but the scope the present disclosure shall still be subject to the scope defined in the appended claims.

What is claimed is:

1. An antenna assembly, comprising:
   an antenna radiator;
   a grounding point, arranged on a middle portion of the antenna radiator; and
   a feeding point, arranged on the antenna radiator and spaced from the grounding point;
   wherein the feeding point is fed by a feeding source, such that the antenna radiator supports a first frequency band and a second frequency band, wherein the first frequency band is different from the second frequency band;
   wherein the antenna assembly further comprises an impedance matching circuit electrically connected between the feeding point and the feeding source, and the impedance matching circuit comprises an inductor L1, a capacitor C1, an inductor L2, and an inductor L3;
   the inductor L1 and the capacitor C1 are connected in series between the feeding point and the feeding source;
   one end of the inductor L2 is electrically connected to a connection point between the inductor L1 and the capacitor C1, and the other end of the inductor L2 is grounded;
   one end of the inductor L3 is electrically connected between the capacitor C1 and the feeding source, and the other end of the inductor L3 is grounded.

2. The antenna assembly as claimed in claim 1, wherein a monopole antenna mode and a dipole antenna mode are excited on the antenna radiator under excitation of the feeding source;
   the monopole antenna mode is configured to support the first frequency band, and the dipole antenna mode is configured to support the second frequency band.

3. The antenna assembly as claimed in claim 1, further comprising:
   an antenna bracket; wherein the antenna radiator is arranged on the antenna bracket.

4. The antenna assembly as claimed in claim 3, wherein the antenna radiator is arranged on the antenna bracket through laser-direct-structuring (LDS) or laser reconstructed print (LRP) technology.

5. The antenna assembly as claimed in claim 3, wherein the antenna radiator is a metal radiation patch and the metal radiation patch is in a shape of a line, a "U", a zigzag, or an arc.

6. The antenna assembly as claimed in claim 5, wherein in response the metal radiation patch of the antenna radiator being in the shape of the line and the shape of the line being a rectangle, the middle portion is a center point of a long side of the rectangle.

7. The antenna assembly as claimed in claim 5, wherein in response the metal radiation patch of the antenna radiator being in the shape of the "U", the shape of the "U" comprises a first portion, a second portion, and a third portion, the first portion and the third portion are connected to the second portion, the middle portion is a center point of a long side of the second portion, and the feeding point is located at the long side of the second portion and spaced from the grounding point.

8. The antenna assembly as claimed in claim 7, wherein the third portion has a length greater than or equal to that of the first portion.

9. The antenna assembly as claimed in claim 8, wherein in response to the third portion having a length greater than that of the first portion, the third portion defines the slot.

10. The antenna assembly as claimed in claim 1, wherein the antenna radiator is arranged on a printed circuit board (PCB) of an electronic device where the antenna assembly is located, and the antenna radiator is a metal radiation patch.

11. The antenna assembly as claimed in claim 1, wherein the feeding point is electrically connected to the feeding source through an elastic sheet, and the grounding point is grounded through another elastic sheet.

12. A dual-frequency wideband antenna, comprising:
   an antenna assembly, comprising:
      an antenna radiator;
      a grounding point, arranged on a middle portion of the antenna radiator; and
      a feeding point, arranged on the antenna radiator and spaced from the grounding point;
   wherein the feeding point is fed by a feeding source, such that the antenna radiator supports a first frequency band and a second frequency band, wherein the first frequency band is different from the second frequency band;
   wherein the antenna assembly further comprises an impedance matching circuit electrically connected between the feeding point and the feeding source, and the impedance matching circuit comprises an inductor L1, a capacitor C1, an inductor L2, and an inductor L3;
   the inductor L1 and the capacitor C1 are connected in series between the feeding point and the feeding source;
   one end of the inductor L2 is electrically connected to a connection point between the inductor L1 and the capacitor C1, and the other end of the inductor L2 is grounded;
   one end of the inductor L3 is electrically connected between the capacitor C1 and the feeding source, and the other end of the inductor L3 is grounded.

13. The dual-frequency wideband antenna as claimed in claim 12, wherein a monopole antenna mode and a dipole antenna mode are excited on the antenna radiator under excitation of the feeding source;
   the monopole antenna mode is configured to support the first frequency band, and the dipole antenna mode is configured to support the second frequency band.

14. The dual-frequency wideband antenna as claimed in claim 13, wherein a length of the antenna radiator is 8 mm, a width of the antenna radiator is 2 mm, a distance between the feeding point and the grounding point is 2 mm.

15. An electronic device, comprising a dual-frequency wideband antenna; wherein the dual-frequency wideband antenna comprises:
   an antenna assembly, comprising:
      an antenna radiator;
      a grounding point, arranged on a middle portion of the antenna radiator; and
      a feeding point, arranged on the antenna radiator and spaced from the grounding point;
      wherein the feeding point is fed by a feeding source, such that the antenna radiator supports a first frequency band and a second frequency band, wherein the first frequency band is different from the second frequency band;
      wherein the antenna assembly further comprises an impedance matching circuit electrically connected between the feeding point and the feeding source, and the impedance matching circuit comprises an inductor L1, a capacitor C1, an inductor L2, and an inductor L3;

the inductor L1 and the capacitor C1 are connected in series between the feeding point and the feeding source;

one end of the inductor L2 is electrically connected to a connection point between the inductor L1 and the capacitor C1, and the other end of the inductor L2 is grounded;

one end of the inductor L3 is electrically connected between the capacitor C1 and the feeding source, and the other end of the inductor L3 is grounded.

16. The electronic device as claimed in claim 15, wherein a monopole antenna mode and a dipole antenna mode are excited on the antenna radiator under excitation of the feeding source;

the monopole antenna mode is configured to support the first frequency band, and the dipole antenna mode is configured to support the second frequency band.

* * * * *